United States Patent
Cao et al.

(10) Patent No.: US 10,300,462 B2
(45) Date of Patent: May 28, 2019

(54) HIGH CONCENTRATION SILVER SOLUTIONS FOR ETHYLENE OXIDE CATALYST PREPARATION

(71) Applicant: Scientific Design Company, Inc., Little Ferry, NJ (US)

(72) Inventors: Lixin Cao, Belle Mead, NJ (US); Andrzej Rokicki, Mountain Lakes, NJ (US)

(73) Assignee: SCIENTIFIC DESIGN COMPANY, INC., Little Ferry, NJ (US)

( * ) Notice: Subject to any disclaimer, the term of this patent is extended or adjusted under 35 U.S.C. 154(b) by 354 days.

(21) Appl. No.: 14/575,035

(22) Filed: Dec. 18, 2014

(65) Prior Publication Data

US 2015/0174554 A1    Jun. 25, 2015

Related U.S. Application Data

(60) Provisional application No. 61/918,342, filed on Dec. 19, 2013.

(51) Int. Cl.

| | |
|---|---|
| *B01J 23/48* | (2006.01) |
| *B01J 23/50* | (2006.01) |
| *B01J 23/68* | (2006.01) |
| *B01J 37/02* | (2006.01) |
| *B01J 37/06* | (2006.01) |
| *B01J 31/00* | (2006.01) |
| *B01J 35/10* | (2006.01) |

(52) U.S. Cl.
CPC ......... *B01J 23/688* (2013.01); *B01J 37/0203* (2013.01); *B01J 37/0213* (2013.01); *B01J 23/50* (2013.01); *B01J 31/00* (2013.01); *B01J 35/1009* (2013.01); *B01J 37/0207* (2013.01); *B01J 37/06* (2013.01)

(58) Field of Classification Search
CPC .. B01J 23/688; B01J 37/0203; B01J 37/0213; B01J 37/06; B01J 23/50; B01J 31/00; B01J 37/0207; B01J 35/1009
USPC ....... 502/439, 341, 202, 208, 214, 224, 231, 502/332, 216, 347, 222, 213, 328, 340, 502/207, 229, 348, 226
See application file for complete search history.

(56) References Cited

U.S. PATENT DOCUMENTS

| | | |
|---|---|---|
| 3,563,914 A | 2/1971 | Wattimena |
| 3,702,259 A | 11/1972 | Nielsen |
| 4,097,414 A | 6/1978 | Cavitt |
| 4,224,194 A | 9/1980 | Cavitt |
| 4,229,321 A | 10/1980 | Cavitt |
| 4,761,394 A | 8/1988 | Lauritzen |
| 4,766,105 A | 8/1988 | Lauritzen |
| 4,908,343 A | 3/1990 | Bhasin |
| 5,011,807 A | 4/1991 | Hayden et al. |
| 5,011,809 A | 4/1991 | Herzog et al. |
| 5,057,481 A | 10/1991 | Bhasin |
| 5,099,041 A | 3/1992 | Hayden et al. |
| 5,102,848 A | 4/1992 | Soo et al. |
| 5,187,140 A | 2/1993 | Thorsteinson et al. |
| 5,380,697 A | 1/1995 | Matusz et al. |
| 5,407,888 A | 4/1995 | Herzog et al. |
| 5,504,052 A | 4/1996 | Rizkalla et al. |
| 5,739,075 A | 4/1998 | Matusz |
| 6,368,998 B1 | 4/2002 | Lockemeyer |
| 6,656,874 B2 | 12/2003 | Lockemeyer |
| 7,538,235 B2 | 5/2009 | Lockemeyer |
| 7,553,980 B2 | 6/2009 | Rizkalla et al. |
| 7,741,499 B2 | 6/2010 | Lockemeyer |
| 2006/0252643 A1 | 11/2006 | Pak |
| 2006/0281631 A1 | 12/2006 | Gerdes et al. |
| 2007/0037991 A1 | 2/2007 | Rizkalla |
| 2009/0177000 A1 | 7/2009 | Natal et al. |
| 2009/0216034 A1 | 8/2009 | Kano et al. |
| 2010/0140098 A1* | 6/2010 | Uzoh ...................... C25D 3/54 205/96 |
| 2011/0015446 A1 | 1/2011 | Mäurer et al. |

(Continued)

FOREIGN PATENT DOCUMENTS

| | | |
|---|---|---|
| CN | 102527384 A | 7/2012 |
| RU | 2008145498 A | 5/2010 |

(Continued)

OTHER PUBLICATIONS

International Search Report and Written Opinion dated Apr. 24, 2015 received from the Korean Intellectual Property Office and from Application No. PCT/US2014/071131.
Chinese Office Action dated May 24, 2017 issued in corresponding Chinese Patent Appln. No. 201480069982.8.
European Search Report dated Jul. 12, 2017 issued in counterpart European Patent Appln. No. 14871297.9 (PCT/US014071131).
Russian Office Action dated May 11, 2018 issued in Russian Patent Application No. 2016129159, with English translation.
Russian Search Report dated May 10, 2018 issued in Russian Patent Application No. 2016129159, with English translation.

(Continued)

*Primary Examiner* — Haytham Soliman
(74) *Attorney, Agent, or Firm* — Scully Scott Murphy and Presser

(57) ABSTRACT

A silver impregnation solution comprising: (i) silver ions, (ii) a silver concentration enhancer selected from at least one ammonium salt having an anionic component that is thermally decomposable; or at least one amino acid, or a combination thereof, (iii) at least one organic amine; and (iv) water; wherein said components (i)-(iii) are dissolved in said impregnation solution, and oxalic acid may or may not be included. The silver impregnation solution can achieve significantly higher silver concentrations, including at least or above 33, 34, or 35 wt %. Methods for producing a silver catalyst by silver impregnation of a refractory support followed by calcination are also described. The resulting silver catalysts possess high silver loadings of typically at least 17, 18, or 19 wt %.

35 Claims, No Drawings

(56) References Cited

U.S. PATENT DOCUMENTS

| | | |
|---|---|---|
| 2011/0082029 A1 | 8/2011 | Thorsteinson et al. |
| 2012/0149926 A1 | 6/2012 | Evans et al. |
| 2012/0214293 A1* | 8/2012 | Aksu .................. C25D 3/56 |
| | | 438/478 |

FOREIGN PATENT DOCUMENTS

| | | |
|---|---|---|
| RU | 2408424 C2 | 1/2011 |
| WO | WO 2012/144847 A2 | 10/2012 |
| WO | 2013148417 A1 | 10/2013 |

OTHER PUBLICATIONS

Saudi Arabian Office Action dated Dec. 17, 2017 issued in Saudi Arabian Patent Application No. 516371356, with English Translation.

* cited by examiner

HIGH CONCENTRATION SILVER SOLUTIONS FOR ETHYLENE OXIDE CATALYST PREPARATION

CROSS REFERENCE TO RELATED APPLICATIONS

The present disclosure claims benefit of U.S. Provisional Application Ser. No. 61/918,342, filed Dec. 19, 2013, the entire contents of which are incorporated herein by reference.

FIELD OF THE INVENTION

The present disclosure relates to silver-based ethylene oxide catalysts for the oxidative conversion of ethylene to ethylene oxide, and in particular, to their preparation. More particularly, the present disclosure relates to silver impregnating solutions having a high silver concentration, and their use in producing silver-based ethylene oxide catalysts having high activity and selectivity.

BACKGROUND

A high silver loading in an ethylene oxide catalyst is generally known to result in an increased selectivity, activity, and stability. For these reasons, a high silver loading is generally desirable. One method known in the art to increase the silver loading in a catalyst is the use of a high water absorption carrier. However, use of a high water absorption carrier generally leads to the loss of mechanical strength in the catalyst. Another method known in the art to increase the silver loading in a catalyst is the use of a double impregnation process. However, double impregnation generally lowers catalyst productivity and adds complexity to the process when incorporating promoting species.

Conventional silver impregnating solutions of the art typically contain silver oxalate, or a combination of silver oxide and oxalic acid, together in ethylenediamine (EDA). In the conventional oxalic acid formulation, oxalate in oxalic acid provides oxalate anion ($C_2O_4^{2-}$) to counter the charge balance of silver cation ($Ag^+$) in the EDA/water solution to form a soluble $[Ag_2C_2O_4]$-EDA complex. For this reason, the oxalic acid is often referred to as an "anion contributor". The maximum permissible silver concentration in these solutions is generally 31 wt % under ambient conditions. Attempts to increase the silver concentration beyond this generally result in precipitation of silver salts, and thus, the silver concentration in conventional silver solutions is generally adjusted to no more than 31 wt %.

As indicated, there would be a significant benefit and advantage in an impregnating solution that could retain a silver salt in significantly higher concentrations than permitted in the art, while being stable during storage and use, i.e., with complete dissolution of silver in the absence of precipitation. Such an impregnating solution would be useful in producing ethylene oxide catalysts having a high silver loading by more straight-forward means, without the complexity and other drawbacks of conventional methods of the art, such as use of a high water absorption carrier or a double impregnation process.

SUMMARY

In one aspect, the present disclosure is directed to an impregnating solution (i.e., "liquid silver-containing solution") having a higher than conventional silver concentration. The impregnating solution of the instant disclosure includes: (i) silver ions, (ii) a silver concentration enhancer selected from at least one ammonium salt having an anionic component that is thermally decomposable, or at least one amino acid, or a combination thereof; (iii) at least one organic amine; and (iv) water; wherein components (i)-(iii) are dissolved in the impregnating solution. The silver in the impregnating solution is typically present in a concentration of at least 33 wt %. In some embodiments, oxalic acid is included in the impregnating solution, whereas, in other embodiments, oxalic acid is excluded. In particular embodiments, the organic amine is an alkylenediamine, such as ethylenediamine.

In another aspect, the present disclosure is directed to a process for producing a high silver-loaded catalyst useful in the conversion of ethylene to ethylene oxide. In the process, a refractory support is impregnated with silver using the high silver impregnating solution described above, and the impregnated carrier is then calcined to convert silver ions to metallic silver, by methods known in the art of silver catalyst preparation. The resulting high silver-loaded catalyst generally possesses an improved activity, selectivity, and/or stability as compared to silver catalysts having lower silver concentrations.

DETAILED DESCRIPTION

In one aspect, the instant disclosure is directed to a silver impregnating solution having a higher than conventional concentration of silver dissolved therein. In order to be dissolved, the silver in the impregnating solution is necessarily present in the form of silver ions, which, by necessity, are associated with anions in the form of a silver salt or compound. The silver ions may or may not also be complexed with a neutral ligand, such as an amine, diamine, or triamine. Silver salts useful for impregnation include, for example, silver oxalate, silver nitrate, silver oxide, silver carbonate, silver carboxylates, silver citrate, silver phthalate, silver lactate, silver propionate, silver butyrate, as well as higher fatty acid salts and combinations thereof. A wide variety of complexing or solubilizing agents may be employed to solubilize silver to the desired concentration in the impregnating medium. Useful complexing or solubilizing agents include amines, ammonia, lactic acid, and combinations thereof.

In addition to silver ion, the impregnating solution described herein contains at least one organic amine compound. The organic amine can be any of the amine compounds known in the art that function as complexing and/or solubilizing agents for silver ion. Generally, the organic amine possesses at least one primary or secondary amine group. The organic amine should be completely soluble in an aqueous-based solvent, which may be water or water in admixture with a water-soluble solvent. The organic amine can be, for example, an alkylamine, alkylenediamine, dialkylenetriamine, or alkanolamine. Some examples of alkylamines include ethylamine, diethylamine, n-propylamine, di(n-propylamine), isopropylamine, diisopropylamine, n-butylamine, isobutylamine, sec-butylamine, and t-butylamine Some examples of alkylenediamines include ethylenediamine (EDA), 1,2-propylenediamine, 1,3-propylenediamine, and 1,4-butylenediamine. Some examples of dialkylenetriamines include diethylenetriamine and dipropylenetriamine. Some examples of alkanolamines include ethanolamine, diethanolamine, propanolamine (i.e., 1-amino-2-propanol or 1-amino-3-propanol), and dipropanolamine. The organic amine is typically present in the impregnating solution in an amount from about 0.1 to about 5.0 moles per mole of silver, or about 0.2 to about 4.0 moles per mole of silver, or about 0.3 to about 3.0 moles per mole of silver. As used herein, the term "about" generally indicates no more than ±10%, ±5%, ±2%, or +1% from a number. For example, the term "about 1 mole" generally indicates a value in the range of 0.9 to 1.1 moles in its broadest sense.

The impregnating solution described herein further includes a silver concentration enhancer, particularly at least one ammonium salt having an anionic component that is thermally decomposable, or at least one amino acid, or a combination thereof. The silver concentration enhancer, which may be a single compound or a combination of compounds (e.g., one or more ammonium salts, or one or more amino acids, or one or more ammonium salts in combination with one or more amino acids), is generally present in the silver impregnation solution in an amount of at least 1 wt % with respect to the total weight of the impregnating solution. In different embodiments, the silver concentration enhancer may be included in the impregnating solution in an amount of precisely, about, at least, above, up to, or less than, for example, 1, 2, 5, 10, 15, 20, 25, 30, 35, 40, 45, 50, 55, or 60 wt %, or in an amount within a range bounded by any two of the foregoing exemplary values.

In a first set of embodiments, the silver concentration enhancer is at least one ammonium salt having an anionic component that is thermally decomposable. As used herein, the term "thermally decomposable" indicates that the anion decomposes, generally to gaseous species, which temporarily leaves the ammonium ion isolated. Without being bound by theory, it is believed that the isolated ammonium ion, in the presence of the alkaline organic amine, reacts with the organic amine to form ammonia, which further complexes with the silver ions to form a more soluble polyamine-silver (i.e., $Ag(NH_3)_n^+$) complex, wherein n is generally 2 or 3. In some embodiments, the anion contains at least one carbon atom (i.e., is carbon-containing), and in more particular embodiments, the anion is organic in nature by containing at least one carbon-hydrogen and/or carbon-carbon bond. Some examples of suitable ammonium salts include the ammonium carboxylates, ammonium carbonate, ammonium bicarbonate, ammonium nitrate, ammonium phosphate, diammonium hydrogen phosphate, and ammonium dihydrogen phosphate. Some examples of ammonium carboxylates include ammonium formate, ammonium acetate, ammonium propionate, ammonium butyrate, ammonium valerate, ammonium oxalate, ammonium hydrogen oxalate, ammonium malonate, ammonium hydrogen malonate, ammonium succinate, ammonium hydrogen succinate, ammonium maleate, ammonium hydrogen maleate, ammonium fumarate, ammonium hydrogen fumarate, ammonium malate, ammonium hydrogen malate, ammonium citrate, ammonium tartrate, ammonium lactate, ammonium aspartate, and ammonium glutamate.

Some ammonium salts may be included in impregnating solutions of the art for the purpose of incorporating promoting species into the support and subsequent catalyst. However, the ammonium salts used in the art generally do not possess decomposable anions. Some examples of ammonium salts containing a promoting anionic species include ammonium fluoride, ammonium chloride, ammonium sulfate, ammonium rhenate ($NH_4ReO_4$), and ammonium vanadate, none of which possess a decomposable anion. In contrast with ammonium salts of the art, the ammonium salt used herein includes an anion that is thermally decomposable in the manner described above.

The impregnating solution can contain any suitable solvent in which all of the components of the impregnating solution are completely miscible. The solvent is typically water-based, i.e., aqueous. In one embodiment, the solvent is solely water. In other embodiments, the solvent includes water in admixture with a water-soluble co-solvent, such as an alcohol (e.g., methanol or ethanol), glycol (e.g., ethylene glycol or propylene glycol), or a ketone (e.g., acetone).

The concentration of silver in the impregnation solution is generally at least 33 wt %. In different embodiments, the concentration of silver in the impregnation solution is about, at least, or greater than 34, 35, 36, 37, 38, 39, or 40 wt % by weight of the impregnating solution, or the silver concentration is within a range bounded by any two of the foregoing values.

In one embodiment, oxalic acid is included in the impregnation solution when the ammonium salt of the instant disclosure is present. In another embodiment, oxalic acid is excluded from the impregnation solution when the ammonium salt of the instant disclosure is present. When oxalic acid is included, the ammonium salt of the instant disclosure can be in any suitable mole ratio with the oxalic acid. In different embodiments, the mole ratio of ammonium salt (of the instant disclosure) to oxalic acid is about, at least, above, up to, or less than, for example, 100:1, 90:1, 80:1, 50:1, 40:1, 30:1, 20:1, 10:1, 5:1, 2:1, 1:1, 1:2, 1:5, 1:10, 1:20, 1:30, 1:40, 1:50, 1:80, 1:90, or 1:100, or a mole ratio within a range bounded by any two of the foregoing values. When a single ammonium salt (of the instant disclosure) is included, then the foregoing mole ratios refer to the single ammonium salt, regardless of whether there may also be included ammonium salts not of the instant disclosure. When a combination of ammonium salts of the instant disclosure (e.g., two, three, four, or more) are included, then the foregoing mole ratios may be taken as the total mole ratio of the ammonium salts of the instant disclosure, or the foregoing mole ratios may independently be taken as mole ratios of the individual ammonium salts of the instant disclosure, regardless of whether there may also be included ammonium salts not of the instant disclosure. Alternatively, the amount of ammonium salt (of the instant disclosure) relative to oxalic acid may be stated in terms of a molar percentage (mol %), such as 98, 95, 90, 85, 80, 75, 70, 65, 60, 55, 50, 45, 40, 35, 30, 25, 20, 15, 10, 5, 2, or 1 mol % of ammonium salt relative to the total of ammonium salt and oxalic acid.

In a second set of embodiments, the silver concentration enhancer is at least one amino acid. The amino acid can be any of the known natural or unnatural amino acids, and in particular, any of the known essential amino acids, which generally refer to those amino acids found in abundance in living organisms. The amino acid should have an underivatized amino end (i.e., —$NH_2$ or —$NH_3^+$) and an underivatized carboxylic acid end (i.e., —COOH or —COO$^-$). In the event of a charge on any or both of the amino and carboxyl ends, the amino acid is understood to possess a suitable counterion. The one or more amino acids can be selected from, for example, glycine, alanine, valine, leucine, isoleucine, cysteine, methionine, phenylalanine, tyrosine, tryptophan, proline, serine, threonine, asparagine, glutamine, aspartic acid, glutamic acid, histidine, lysine, and arginine. Generally, the amino acid considered herein is an alpha-amino acid, as typically found in living organisms. However, beta-amino acids (e.g., beta-alanine) and gamma-amino acids (e.g., gamma-aminobutyric acid, also known as GABA) are also considered herein as amino acids.

The amino acid is typically characterized by the nature of its side chain, which, in the case of alpha-amino acids, is located at the alpha carbon. In a first embodiment, the amino acid does not possess a side chain (i.e., other than hydrogen atom), as found in glycine, beta-alanine, and gamma-aminobutyric acid. In a second embodiment, the amino acid possesses an aliphatic side chain, such as found in alanine, valine, leucine, and isoleucine. An example of a less common aliphatic amino acid, but considered herein, is alpha-aminobutyric acid, also known as homoalanine, which possesses an ethyl group as its side chain instead of the methyl group side chain of alanine. In a third embodiment, the amino acid possesses an aromatic side chain, such as found in phenylalanine, tyrosine, tryptophan, and histidine. In a fourth embodiment, the amino acid possesses one or more nitrogen atoms in its side chain, such as found in lysine, arginine, histidine, tryptophan, asparagine, and glutamine. In a fifth embodiment, the amino acid possesses a sulfur-containing group in its side chain, such as found in cysteine, homocysteine, and methionine. In some embodiments, the amino acid does not contain a heteroatom (i.e., an atom other than carbon and hydrogen) in its side chain, while in other embodiments, the amino acid is permitted to possess a heteroatom in its side chain.

In particular embodiments, the amino acid is selected from one or more of glycine, alanine, valine, leucine, and isoleucine, or more particularly, glycine, alanine, and valine, or more particularly, glycine and alanine, or more particularly, glycine. In some embodiments, any of the groupings of amino acids provided in this disclosure indicates a minimum set from which one or more amino acids are selected, without excluding amino acids not belonging to the indicated set. In other embodiments, any of the above-disclosed groups of amino acids indicates a closed set from which one or more amino acids are selected, with the complete or partial exclusion of amino acids not belonging to the indicated set. Moreover, any two or more exemplary sets of amino acids provided above may be combined as a larger set from which one or more amino acids are selected from. In yet other embodiments, any one or more groupings or specific types of amino acids provided above may be excluded.

The term "amino acid" may herein also include dipeptides or tripeptides, as long as the dipeptide or tripeptide possesses underivatized amino and carboxylic acid ends. The dipeptide or tripeptide necessarily possesses one or two amide bonds, respectively, and can contain any two or three amino acids, such as those described above, linked by one or two amide bonds, respectively. The dipeptide can be, for example, glycylglycine, i.e., $H_2NCH_2C(O)NHCH_2C(O)OH$, or glycylalanine, i.e., $H_2NCH_2C(O)NHCH(CH_3)C(O)OH$. The tripeptide can be, for example, glycine-glycine-glycine, glycine-alanine-glycine, glycine-glycine-alanine, glycine-glycine-valine, and glycine-alanine-valine.

In one embodiment, oxalic acid is included in the impregnation solution when the amino acid is present. In another embodiment, oxalic acid is excluded from the impregnation solution when the amino acid is present. When oxalic acid is included, the amino acid of the instant disclosure can be in any suitable mole ratio with the oxalic acid. In different embodiments, the mole ratio of amino acid to oxalic acid is about, at least, above, up to, or less than, for example, 100:1, 90:1, 80:1, 50:1, 40:1, 30:1, 20:1, 10:1, 5:1, 2:1, 1:1, 1:2, 1:5, 1:10, 1:20, 1:30, 1:40, 1:50, 1:80, 1:90, or 1:100, or a mole ratio within a range bounded by any two of the foregoing values. When a single amino acid is included, then the foregoing mole ratios refer to the single amino acid. When a combination of amino acids (e.g., two, three, four, or more) are included, then the foregoing mole ratios may be taken as the total mole ratio of the amino acids, or the foregoing mole ratios may independently be taken as mole ratios of the individual amino acids. Alternatively, the amount of amino acid relative to oxalic acid may be stated in terms of a molar percentage (mol %), such as 98, 95, 90, 85, 80, 75, 70, 65, 60, 55, 50, 45, 40, 35, 30, 25, 20, 15, 10, 5, 2, or 1 mol % of amino acid relative to the total of amino acid and oxalic acid.

In some embodiments, the silver concentration enhancer is a combination of at least one ammonium salt according to the instant disclosure along with at least one amino acid. For example, in some embodiments, one or more of the above-disclosed amino acids may be combined with one or more ammonium carboxylates, or one or more of any of the ammonium salts disclosed above may be combined with one or more amino acids selected from glycine, alanine, valine, leucine, and isoleucine, or one or more of any of the above-disclosed ammonium carboxylates may be combined with one or more amino acids selected from glycine, alanine, valine, leucine, and isoleucine. The instant application considers any combination of ammonium salt with amino acid, although in some embodiments, one or more combinations may be prohibited if they are reactive with each other or have an adverse effect on silver solubility or other characteristic of the silver impregnating solution.

In some embodiments, the impregnating solution contains one or more promoting species. The one or more promoting species can be any of those species, known in the art, that function to improve the activity or selectivity of the silver catalyst. The promoting species can be, for example, an alkali, alkaline earth, transition, or main group element, typically included in the form of a salt, e.g., lithium nitrate, cesium hydroxide, ammonium sulfate, and/or ammonium rhenate. In other embodiments, the impregnating solution does not include a promoting species.

In another aspect, the instant disclosure is directed to a method for producing a catalyst effective in the oxidative conversion of ethylene to ethylene oxide. In the method, a refractory carrier is impregnated with the silver impregnation solution described above, and the silver-impregnated carrier subjected to a calcination process to convert ionic silver to metallic silver by methods well known in the art, and as further described below. In some embodiments, the carrier may be impregnated, and the silver-impregnated carrier stored for a time, and possibly shipped to a different location, before being calcined. In other embodiments, the carrier is impregnated and directly subjected to a calcination process in the same facility.

The carrier, which is typically porous, may be selected from any of the solid refractory carriers known in the art for use in silver-based catalysts. Some examples of carrier materials include alumina (e.g., alpha-alumina), charcoal, pumice, magnesia, zirconia, titania, kieselguhr, fuller's earth, silicon carbide, silica, silicon carbide, clays, artificial zeolites, natural zeolites, silicon dioxide and/or titanium dioxide, ceramics, and combinations thereof.

In some embodiments, the carrier includes or is completely composed of alumina, which may be a single type of alumina (e.g., alpha-alumina) or mixture of alumina compositions (e.g., gamma- and alpha-alumina). The alpha-alumina may be of a high purity, i.e., at least or greater than 95 wt % or 98 wt % alpha-alumina. The alpha-alumina carrier may or may not also include inorganic oxides other than alpha-alumina, such as silica, alkali metal oxides (e.g., sodium oxide) and trace amounts of other metal-containing or non-metal-containing additives or impurities.

The carrier precursor particles can be of any suitable size, and are typically microparticles. In different embodiments, the carrier microparticles can have a particle size (i.e., diameter, if substantially spherical) of precisely, about, at least, greater than, up to, or less than, for example, 1, 2, 3, 4, 5, 6, 7, 8, 9, 10, 12, 15, or 20 microns (μm), or the carrier microparticles may have a size within a range bounded by any two of the foregoing exemplary values. The carrier precursor particles may also be composed of two or more portions of microparticles of different sizes or size ranges, typically selected from the above exemplary sizes. Moreover, each portion of the carrier precursor particles may be in a suitable weight percentage by total weight of carrier precursor or finished carrier (before silver impregnation). In different embodiments, one or more portions of carrier microparticles in different size ranges may be present in an amount of precisely, about, at least, greater than, up to, or less than, for example, 1 wt %, 2 wt %, 5 wt %, 20 wt %, 25 wt %, 30 wt %, 40 wt %, 50 wt %, 60 wt %, 70 wt %, 80 wt %, 90 wt %, 95 wt %, 98 wt %, or 99 wt %, or within a weight percentage (wt %) range bounded by any of the foregoing values.

The carrier may be produced by conventional techniques well known to those skilled in the art, such as by combining alumina microparticles, a solvent (e.g., water), a temporary binder or burnout material, a permanent binder, and/or a porosity controlling agent, and then shaping, molding, or extruding the resulting paste, before firing (i.e., calcining) the preform by methods well known in the art. Temporary binders, or burnout materials, include cellulose, substituted celluloses, e.g., methylcellulose, ethylcellulose, and carboxyethylcellulose, stearates (such as organic stearate esters, e.g., methyl or ethyl stearate), waxes, granulated polyolefins (e.g., polyethylene and polypropylene), walnut shell flour, and the like, which are decomposable at the temperatures employed. The binders are responsible for imparting porosity to the carrier material. Burnout material is used primarily to ensure the preservation of a porous structure during the green (i.e., unfired phase) in which the mixture may be shaped into particles by molding or extrusion processes. Burnout materials are essentially completely removed during the firing to produce the finished carrier. Alternatively, the carrier may be purchased from a catalyst carrier provider. Some specific carrier formulations and methods for their preparation are described in U.S. Application Pub. No. 2007/0037991, the contents of which are herein incorporated by reference in their entirety.

The formed paste is extruded or molded into the desired shape and fired at a temperature typically from about 1200° C. to about 1600° C. to form the carrier. In embodiments in which the particles are formed by extrusion, it may be desirable to include conventional extrusion aids. Generally, the performance of the carrier is enhanced if it is treated by soaking the carrier in a solution of an alkali hydroxide, such as sodium hydroxide, potassium hydroxide, or an acid such as $HNO_3$ as described in U.S. Patent Application Publication No. 2006/0252643 A1. After treatment, the carrier is preferably washed, such as with water, to remove unreacted dissolved material and treating solution, and then optionally dried.

The carrier is typically porous, generally with a B.E.T. surface area of up to 20 $m^2/g$. The B.E.T. surface area is more typically in the range of about 0.1 to 10 $m^2/g$, and more typically from 1 to 5 $m^2/g$. In other embodiments, the carrier is characterized by a B.E.T. surface area of about 0.3 $m^2/g$ to about 3 $m^2/g$, or a surface area of about 0.6 $m^2/g$ to about 2.5 $m^2/g$, or a surface area of about 0.7 $m^2/g$ to about 2.0 $m^2/g$. The B.E.T. surface area described herein can be measured by any suitable method, but is more preferably obtained by the method described in Brunauer, S., et al., *J Am. Chem. Soc.*, 60, 309-16 (1938). The final carrier typically possesses a water absorption value (water pore volume) ranging from about 0.10 cc/g to about 0.80 cc/g, more typically from about 0.2 cc/g to about 0.8 cc/g, and more typically from about 0.25 cc/g to about 0.6 cc/g.

The carrier, if porous, can have any suitable distribution of pore diameters. As used herein, the term "pore diameter" is meant to indicate a pore size. The pore volume (and pore size distribution) described herein can be measured by any suitable method, such as by the conventional mercury porosimeter method described in, for example, Drake and Ritter, *Ind. Eng. Chem. Anal. Ed.*, 17, 787 (1945). Typically, the pore diameters are at least about 0.01 microns (0.01 μm), and more typically, at least about 0.1 μm. Typically, the pore diameters are no more than or less than about 10, 15, 20, 25, 30, 35, 40, 45, or 50 μm. In different embodiments, the pore diameters are about, at least, above, up to, or less than, for example, 0.2 μM, 0.5 μM, 1.0 μm, 1.2 μm, 1.5 μm, 1.8 μm, 2.0 μm, 2.5 μm, 3 μm, 3.5 μm, 4 μm, 4.5 μm, 5 μm, 5.5 μm, 6 μm, 6.5 μm, 7 μm, 7.5 μm, 8 μm, 8.5 μm, 9 μm, 9.5 μm, 10 μm, or 10.5 μm, or the pore diameters are within a range bounded by any two of the foregoing exemplary values. Any range of pore sizes, as particularly derived from any of the above exemplary values, may also contribute any suitable percentage of the total pore volume, such as at least, greater than, up to, or less than, for example, 1, 2, 5, 10, 15, 20, 25, 30, 40, 50, 60, 70, 80, 90, 95, or 98% of the total pore volume. In some embodiments, a range of pore sizes may provide the total (i.e., 100%) pore volume.

The carrier may possess a pore size distribution (e.g., within a range as set forth above) characterized by the presence of one or more pore sizes of peak concentration, i.e., one or more maxima (where the slope is approximately zero) in a pore size vs. pore volume distribution plot. A pore size of maximum concentration is also referred to herein as a peak pore size, peak pore volume, or peak pore concentration. Furthermore, each pore size distribution can be characterized by a single mean pore size (mean pore diameter) value. Accordingly, a mean pore size value given for a pore size distribution necessarily corresponds to a range of pore sizes that results in the indicated mean pore size value. Any of the exemplary pore sizes provided above can alternatively be understood to indicate a mean (i.e., average or weighted average) or median pore size in a pore size distribution. Any of the exemplary pore sizes provided above may also be interpreted to be the lower and upper bounds of a peak in a pore volume distribution plot.

In some embodiments, the carrier possesses a multimodal pore size distribution within any of the pore size ranges described above. The multimodal pore size distribution can be, for example, bimodal, trimodal, or of a higher modality. The multimodal pore size distribution is characterized by the presence of different pore sizes of peak concentration (i.e., different peak pore sizes) in a pore size vs. pore volume distribution plot. The different peak pore sizes are preferably within the range of pore sizes given above. Each peak pore size can be considered to be within its own pore size distribution (mode), i.e., where the pore size concentration on each side of the distribution falls to approximately zero (in actuality or theoretically). In one embodiment, different pore size distributions, each having a peak pore size, are non-overlapping by being separated by a volume concentration of pores of approximately zero (i.e., at baseline). In another embodiment, different pore size distributions, each having a peak pore size, are overlapping by not being separated by a volume concentration of pores of approximately zero. Each mode of pores may contribute any suitable percentage of the total pore volume, such as any of the percentages or ranges thereof, provided above.

The macroscale shape and morphology of the carrier, i.e., after compounding and calcining of the carrier particles, can be any of the numerous shapes and morphologies known in the art. For example, the carrier can be in the form of particles, chunks, pellets, rings, spheres, three-holes, wagon wheels, cross-partitioned hollow cylinders, and the like, of a size preferably suitable for employment in fixed-bed epoxidation reactors. In particular embodiments, the macroscopic carrier units may have equivalent diameters of about, for example, 1, 2, 3, 4, 5, 6, 7, 8, 9, 10, 11, 12, 13, 14, or 15 mm, or an equivalent diameter within a range bounded by any two of the foregoing exemplary values. As known in the art, the term "equivalent diameter" is used to express the size of an irregularly-shaped object by expressing the size of the object in terms of the diameter of a sphere having the same volume as the irregularly-shaped object. The equivalent diameter is preferably compatible with the internal diameter of the tubular reactors in which the catalyst is placed. Alternatively, the equivalent diameter is the diameter of a sphere having the same external surface area (i.e., neglecting surface area within the pores of the particle) to volume ratio as the carrier units being employed.

In order to produce a catalyst for the oxidation of ethylene to ethylene oxide, a carrier having any of the above characteristics is first provided with a catalytically effective amount of silver by impregnating the carrier using the silver impregnation solution described above. The carrier can be impregnated with silver and any desired promoters by any of the conventional methods known in the art, e.g., by excess solution impregnation (immersion), incipient wetness impregnation, spray coating, and the like. Typically, the carrier material is placed in contact with the silver-containing solution until a sufficient amount of the solution is absorbed by the carrier. In some embodiments, the quantity of the silver-containing solution used to impregnate the carrier is no more than is necessary to fill the pore volume of the carrier. Infusion of the silver-containing solution into the carrier can be aided by application of a vacuum. A single impregnation or a series of impregnations, with or without intermediate drying, may be used, depending in part on the concentration of the silver component in the solution. Impregnation procedures are described in, for example, U.S. Pat. Nos. 4,761,394, 4,766,105, 4,908,343, 5,057,481, 5,187,140, 5,102,848, 5,011,807, 5,099,041 and 5,407,888, all of which are incorporated herein by reference. Known procedures for pre-deposition, co-deposition, and post-deposition of the various promoters can also be employed.

After impregnation with silver and any promoters (e.g., one or more of Cs, Re, Li, W, F, P, Ga, and/or S), the impregnated carrier is removed from the solution and calcined for a time sufficient to reduce the silver component to metallic silver and to remove volatile decomposition products from the silver-containing support. The calcination is typically accomplished by heating the impregnated carrier, preferably at a gradual rate, to a temperature in a range of about 200° C. to about 600° C., more typically from about 200° C. to about 500° C., more typically from about 250° C. to about 500° C., and more typically from about 200° C. or 300° C. to about 450° C., at a reaction pressure in a range from about 0.5 to about 35 bar. In general, the higher the temperature, the shorter the required calcination period. A wide range of heating periods has been described in the art for the thermal treatment of impregnated supports. Reference is made to, for example, U.S. Pat. No. 3,563,914, which indicates heating for less than 300 seconds, and U.S. Pat. No. 3,702,259, which discloses heating from 2 to 8 hours at a temperature of from 100° C. to 375° C. to reduce the silver salt in the catalyst. A continuous or step-wise heating program may be used for this purpose. During calcination, the impregnated support is typically exposed to a gas atmosphere comprising an inert gas, such as nitrogen. The inert gas may also include a reducing agent. After calcination, the amount of silver in the catalyst is typically at least 16, 17, 18, 19, or 20 wt %.

After calcining the high selectivity catalyst, the calcined catalyst is typically loaded into reactor tubes of an epoxidation reactor, typically a fixed bed tubular reactor, utilizing conventional loading methods well known to those skilled in the art. After loading, the catalyst bed may be swept by passing an inert gas such as nitrogen over the catalyst bed.

The produced catalyst preferably exhibits a selectivity of at least 85% for the conversion of ethylene to ethylene oxide. In different embodiments, the produced catalyst exhibits a selectivity of about or at least, for example, 85%, 86%, 87%, 88%, 89%, 90%, 91%, 92%, or 93%, or a selectivity within a range bounded by any two of the foregoing values.

The produced catalyst may also contain one or more promoting species. As used herein, a "promoting amount" of a certain component of a catalyst refers to an amount of that component that works effectively to provide an improvement in one or more of the catalytic properties of the catalyst when compared to a catalyst not containing said component. Examples of catalytic properties include, inter alia, operability (resistance to runaway), selectivity, activity, conversion, stability and yield. It is understood by one skilled in the art that one or more of the individual catalytic properties may be enhanced by the "promoting amount" while other catalytic properties may or may not be enhanced or may even be diminished. It is further understood that different catalytic properties may be enhanced at different operating conditions. For example, a catalyst having enhanced selectivity at one set of operating conditions may be operated at a different set of conditions wherein the improvement is exhibited in the activity rather than in the selectivity. All of the promoters, aside from the alkali metals, can be in any suitable form, including, for example, as zerovalent metals or higher valent metal ions.

In some embodiments, the produced catalyst may include a promoting amount of an alkali metal or a mixture of two or more alkali metals. Suitable alkali metal promoters include, for example, lithium, sodium, potassium, rubidium, cesium or combinations thereof. Cesium is often preferred, with combinations of cesium with other alkali metals also being preferred. The amount of alkali metal will typically range from about 10 ppm to about 3000 ppm, more typically from about 15 ppm to about 2000 ppm, more typically from about 20 ppm to about 1500 ppm, and even more typically from about 50 ppm to about 1000 ppm by weight of the total catalyst, expressed in terms of the alkali metal.

The produced catalyst may also include a promoting amount of a Group IIA alkaline earth metal or a mixture of two or more Group IIA alkaline earth metals. Suitable alkaline earth metal promoters include, for example, beryllium, magnesium, calcium, strontium, and barium or combinations thereof. The amounts of alkaline earth metal promoters can be used in amounts similar to those used for the alkali or transition metal promoters.

The produced catalyst may also include a promoting amount of a main group element or a mixture of two or more main group elements. Suitable main group elements include any of the elements in Groups IIIA (boron group) to VIIA (halogen group) of the Periodic Table of the Elements. For example, the carrier or catalyst can include a promoting amount of sulfur, phosphorus, boron, halogen (e.g., fluorine), gallium, or a combination thereof. The main group element may be present in the form of a compound. Aside from the halogens, the main group element may be present in its elemental form.

The produced catalyst may also include a promoting amount of a transition metal or a mixture of two or more transition metals. Suitable transition metals can include, for example, the elements from Groups IIIB (scandium group), IVB (titanium group), VB (vanadium group), VIB (chromium group), VIIB (manganese group), VIIIB (iron, cobalt, nickel groups), IB (copper group), and IIB (zinc group) of the Periodic Table of the Elements, as well as combinations thereof. More typically, the transition metal is an early transition metal, i.e., from Groups IIIB, IVB, VB or VIB, such as, for example, hafnium, yttrium, molybdenum, tungsten, rhenium, chromium, titanium, zirconium, vanadium, tantalum, niobium, or a combination thereof. In one embodiment, the transition metal promoter is present in an amount from about 10 ppm to about 1000 ppm of total carrier or catalyst expressed as the metal. In another embodiment, the transition metal promoter is present in an amount from about 20 ppm to about 500 ppm of total carrier or catalyst expressed as the metal. In a further embodiment, the transition metal promoter is present in an amount from about 30 ppm to about 350 ppm of total carrier or catalyst expressed as the metal. Alternatively, the transition metal can be present in an amount of from about 0.1 micromoles per gram to about 10 micromoles per gram, more typically from about 0.2 micromoles per gram to about 5 micromoles per gram, and even more typically from about 0.5 micromoles per gram to about 4 micromoles per gram of the carrier or silver-containing catalyst, expressed in terms of the metal.

Of the transition metal promoters listed, rhenium (Re) is a particularly efficacious promoter for ethylene epoxidation high selectivity catalysts. The rhenium component in the carrier or catalyst can be in any suitable form, but is more typically one or more rhenium-containing compounds (e.g., a rhenium oxide) or complexes. The rhenium can be present in an amount of, for example, about 0.001 wt. % to about 1 wt. %. More typically, the rhenium is present in amounts of, for example, about 0.005 wt. % to about 0.5 wt. %, and even more typically, from about 0.01 wt. % to about 0.05 wt. % based on the weight of the total carrier, or by weight of the catalyst including the carrier, expressed as rhenium metal.

The produced catalyst may also include a promoting amount of a rare earth metal or a mixture of two or more rare earth metals. The rare earth metals include any of the elements having an atomic number of 57-103. Some examples of these elements include lanthanum (La), cerium (Ce), and samarium (Sm). The amount of rare earth metal promoters can be used in amounts similar to those used for the transition metal promoters.

In a first set of embodiments, the carrier, before impregnation, contains one or more of any of the promoters described above. In a second set of embodiments, the carrier is provided with one or more promoters during silver impregnation by including the promoters in the silver-containing solution. In the latter embodiment, the carrier, before silver impregnation, may or may not contain any or all of the promoters described above. In a third set of embodiments, the carrier, after silver impregnation and calcination, is provided with one or more promoters in a post-processing step. In the latter embodiment, the carrier, before impregnation or calcination, may or may not contain any or all of the promoters described above.

In another aspect, the instant disclosure is directed to a method for the vapor phase production of ethylene oxide by conversion of ethylene to ethylene oxide in the presence of oxygen by use of the catalyst described above. Generally, the ethylene oxide production process is conducted by continuously contacting an oxygen-containing gas with ethylene in the presence of the catalyst at a temperature in the range from about 180° C. to about 330° C., more typically from about 200° C. to about 325° C., and more typically from about 225° C. to about 270° C., at a pressure which may vary from about atmospheric pressure to about 30 atmospheres depending on the mass velocity and productivity desired. Pressures in the range of from about atmospheric to about 500 psi are generally employed. Higher pressures may, however, be employed within the scope of this disclosure. Residence times in large-scale reactors are generally on the order of about 0.1 to about 5 seconds. A typical process for the oxidation of ethylene to ethylene oxide comprises the vapor phase oxidation of ethylene with molecular oxygen in the presence of the inventive catalyst in a fixed bed, tubular reactor. Conventional commercial fixed bed ethylene oxide reactors are typically in the form of a plurality of parallel elongated tubes (in a suitable shell). In one embodiment, the tubes are approximately 0.7 to 2.7 inches O.D. and 0.5 to 2.5 inches I.D. and 15-45 feet long filled with catalyst.

The inventive catalysts are particularly active and selective in the conversion of ethylene to ethylene oxide. The conditions for conducting such an oxidation reaction in the presence of the catalyst herein described broadly comprise those described in the prior art. This applies, for example, to suitable temperatures, pressures, residence times, diluent materials (e.g., nitrogen, carbon dioxide, steam, argon, methane or other saturated hydrocarbons), the presence or absence of moderating agents to control the catalytic action (e.g., 1,2-dichloroethane, vinyl chloride or ethyl chloride), the desirability of employing recycle operations or applying successive conversion in different reactors to increase the yields of ethylene oxide, and other particular conditions that may be beneficial for converting ethylene to ethylene oxide. Molecular oxygen employed as a reactant may be obtained from conventional sources, and may be relatively pure oxygen, or a concentrated oxygen stream comprising oxygen in a major amount with lesser amounts of one or more diluents such as nitrogen or argon, or air.

In the production of ethylene oxide, reactant feed mixtures typically contain from about 0.5 to about 45% ethylene and from about 3 to about 15% oxygen, with the balance comprising comparatively inert materials including such substances as nitrogen, carbon dioxide, methane, ethane, argon and the like. Only a portion of the ethylene is typically reacted per pass over the catalyst. After separation of the desired ethylene oxide product and removal of an appropriate purge stream and carbon dioxide to prevent uncontrolled build up of inert products and/or by-products, unreacted materials are typically returned to the oxidation reactor. For purposes of illustration only, the following are conditions that may be used in a conventional industrial ethylene oxide reactor unit: a gas hourly space velocity (GHSV) of 1500-10,000 $h^{-1}$, a reactor inlet pressure of 150-400 psig, a coolant temperature of 180-315° C., an oxygen conversion level of 10-60%, and an EO production (work rate) of 100-300 kg EO per cubic meters of catalyst per hour.

Typically, the feed composition at the reactor inlet comprises 1-40% ethylene, 3-12% oxygen, 0.3-40% $CO_2$, 0-3% ethane, 0.3-20 ppmv total concentration of organic chloride moderator, with the balance of the feed being argon, methane, nitrogen, or mixtures thereof.

Some examples of organic chloride moderators that can be employed in the present disclosure include, for example, organic halides, such as $C_1$ to $C_8$ halohydrocarbons, which may be, for example, methyl chloride, ethyl chloride, ethylene dichloride, vinyl chloride, or a mixture thereof. Also suitable are hydrogen-free chlorine sources, such as perhalogenated hydrocarbons and diatomic chlorine, both of which are particularly effective as moderators in gas phase epoxidation. Perhalogenated hydrocarbons refer to organic molecules in which all of the hydrogen atoms in a hydrocarbon have been substituted with halogen atoms. Some examples of perhalogenated hydrocarbons include trichlorofluoromethane and perchloroethylene. The concentration of the moderator should be controlled so as to balance a number of competing performance characteristics. For example, moderator concentration levels that result in improved activity may simultaneously lower selectivity. Controlling moderator concentration level is particularly important with rhenium-containing catalysts of the present disclosure, because as the rhenium-containing catalysts age, the moderator concentration must be carefully monitored so as to continually increase, within small increments, since optimal selectivity values are obtained only within a narrow moderator concentration range.

In other embodiments, the process of ethylene oxide production includes the addition of oxidizing gases to the feed to increase the efficiency of the process. For example, U.S. Pat. No. 5,112,795 discloses the addition of 5 ppm of nitric oxide to a gas feed having the following general composition: 8 volume % oxygen, 30 volume % ethylene, about 5 ppmw ethyl chloride, with the balance as nitrogen.

The resulting ethylene oxide is separated and recovered from the reaction products using methods known in the art. The ethylene oxide process may include a gas recycle process wherein a portion or substantially all of the reactor effluent is readmitted to the reactor inlet after substantially removing the ethylene oxide product and byproducts. In the recycle mode, carbon dioxide concentrations in the gas inlet to the reactor may be, for example, about 0.3 to about 6 volume percent, and more typically, about 0.3 to about 2.0 volume percent.

Examples have been set forth below for the purpose of further illustrating the invention. The scope of this invention is not to be in any way limited by the examples set forth herein.

EXAMPLES

Silver Impregnating Solutions Containing One or More Ammonium Salts as a Silver Concentration Enhancer In the following examples, oxalic acid has been replaced, in whole or in part, with one or more ammonium-containing anion contributors having a thermally decomposable anion, such as ammonium carbonate, ammonium bicarbonate, ammonium formate, and/or ammonium oxalate. It has herein been found that the use of ammonium-based anion contributors increases silver solubility in impregnation solutions, even in the absence of oxalic acid. Silver solubility can also be improved by mixing the ammonium-based salts with oxalic acid at different mole fractions.

To illustrate the mixture composition, the mole fraction of each anion contributor is defined as follows:

$$x_i = \frac{n_i \times e_i}{\sum_{i=1}^{N} (n_i \times e_i)} \quad (1)$$

In the above Formula (1), $n_i$ is the mole number of anion contributor i, and $e_i$ is the charge number of anion i. Charge numbers for oxalate ($C_2O_4^{2-}$), carbonate ($CO_3^{2-}$), bicarbonate ($HCO_3^-$), and formate ($HCOO^-$) are 2, 2, 1, and 1, respectively. The denominator in Equation 1 is the total mole of negative charge. The numerator is the negative charge from anion contributor i. For example, to make 1.0 kg of Ag solution with Ag solubility of 35%, the following starting materials were used:

Silver oxide: 375.94 g
Water: 203.72 g
Ethylenediamine: 195.00 g
Oxalic acid: 81.81 g
Ammonium oxalate: 69.16 g
Ammonium bicarbonate: 51.30 g
Ammonium formate: 20.50 g The mole fraction for each anion contributor is calculated as follows:

| Anion contributor | Weight (g) | Mole ($n_i$) | Charge number ($e_i$) | Moles of negative charge ($n_i \times e_i$) | Mole fraction ($\chi_i$) |
|---|---|---|---|---|---|
| Oxalic acid | 81.81 | 0.6489 | 2 | 1.2978 | 0.40 |
| Ammonium oxalate | 69.16 | 0.4867 | 2 | 0.9734 | 0.30 |
| Ammonium bicarbonate | 51.30 | 0.6489 | 1 | 0.6489 | 0.20 |
| Ammonium formate | 20.50 | 0.3245 | 1 | 0.3245 | 0.10 |

In this example, the total moles of negative charge, 3.2446 mol, are from oxalic acid, ammonium oxalate, ammonium bicarbonate, and ammonium formate. The counter-positive charge from $Ag^+$ is the same number, 3.2446 mol, calculated from the amount of silver oxide. The summation of mole fraction is equal to 1. In various embodiments, the individual mole fractions ($\chi_i$) for ammonium salts of the instant disclosure may be independently selected from, for example, 0.05, 0.1, 0.2, 0.3, 0.4, 0.5, 0.6, 0.7, 0.8, 0.9, and 0.95, or a mole fraction within a range bounded by any two of the foregoing values (or a mole fraction of 1 if oxalic acid is not present). Alternatively, any of the foregoing exemplary mole fraction values may represent the total mole fraction of ammonium salts of the instant disclosure.

By the described method, silver loading on the carrier increases by 10-20% in comparison to the conventional oxalic acid method, and the high silver loading results in an enhanced activity with comparable selectivity. This method is also useful for making an EO catalyst on a low water absorption carrier.

Example 1

A carrier having a surface area of 0.67 $m^2/g$ and a water absorption of 43.8 cc/100 g was washed with 0.025 N NaOH solution followed by complete DI water rinsing. The carrier was dried at 150° C. for use.

1500 g of the silver solution was prepared using the following components with a target silver content of 35% in solution. Ammonium oxalate was the sole anion source (i.e., mole fraction of 1).

Silver oxide: 563.9 g

Water: 297.8 g

Ethylenediamine: 292.5 g

Ammonium oxalate: 345.8 g

Solution Preparation:

Water was gradually mixed with ethylenediamine in a container placed in an ice bath to control the solution temperature between 20 and 30° C. with vigorous agitation. Ammonium oxalate was subsequently added to the solution while the temperature was maintained at 20 to 30° C. After ammonium oxalate was completely dissolved, silver oxide was added to the solution at a temperature between 20 to 30° C. Once all silver oxide was added, the solution was agitated for another 30-40 minutes to ensure proper mixing. The solution was filtered using the vacuum pump as a silver stock solution for the catalyst preparation. The solution was covered to prevent the release of ammonia.

Catalyst Preparation:

a. Promoter Addition:

The formulation for the high selectivity catalysts was optimized with the addition of Cs and Re. Promoters were mixed with the stock silver solution prior to impregnation.

b. Impregnation:

A 120 g sample of carrier was placed in a pressure vessel and then subjected to vacuum until the pressure was reduced below 10 mm Hg. 360 g of the adjusted silver/promoters solution was introduced to the flask while it was still under vacuum. The pressure of the vessel was allowed to rise to atmospheric pressure. The catalyst was separated from the solution and was now ready for calcination.

c. Calcination:

Calcination was conducted by heating the impregnated carrier up to the decomposition temperature of silver salts. This was achieved via heating in a furnace that has several heating zones in a controlled atmosphere. The impregnated carrier was loaded on a moving belt that entered the furnace at ambient temperature. The temperature was gradually increased as the impregnated carrier passed from one zone to the next. Then the temperature was increased, up 400° C., as the impregnated carrier passed through four heating zones. After the heating zones, the belt passed through a cooling zone that gradually cooled the catalyst to a temperature below 100° C. The atmosphere of the furnace was controlled through the use of nitrogen flow in the different heating zones. The final analytical result indicated that the catalyst contained 18.90% Ag.

Catalyst Testing:

The catalyst was tested in a stainless steel tube. A gas mixture containing 15% ethylene, 7% oxygen, and 78% inert, mainly nitrogen and carbon dioxide, was passed through the catalyst at 300 prig. The temperature of the reaction was adjusted in order to obtain ethylene oxide productivity of 432 kg per hour per ton of catalyst.

Example 2

Example 1 was repeated with the exception of using ammonium bicarbonate and the starting material weight. Ammonium bicarbonate was the sole anion source (i.e., mole fraction of 1). 1500 g of the silver solution was prepared using the following components with the target Ag content of 36% in solution:

Silver oxide: 580.0 g

Water: 223.3 g

Ethylenediamine: 300.9 g

Ammonium bicarbonate: 395.8 g

Example 3

Example 1 was repeated with the exception of using the mixture of ammonium bicarbonate, ammonium formate, and oxalic acid. Thus, oxalic acid, ammonium bicarbonate, and ammonium formate were the anion sources. The mole fractions for oxalic acid, ammonium bicarbonate, and ammonium formate used were 0.8, 0.1, and 0.1, respectively. 1500 g of the silver solution was prepared using the following components, with the target Ag content of 36% in solution:

Silver oxide: 580.0 g

Water: 295.5 g

Ethylenediamine: 300.9 g

Ammonium bicarbonate: 39.6 g

Ammonium formate: 31.6

Oxalic acid: 252.4

Example 4

Example 1 was repeated with the exception of using the mixture of ammonium oxalate and oxalic acid. Thus, oxalic acid and ammonium oxalate were the anion sources. The mole fractions for oxalic acid and ammonium oxalate were 0.5 and 0.5, respectively. 1500 g of the silver solution was prepared using the following components with the target Ag content of 35% in solution:

Silver oxide: 563.9 g

Water: 317.3 g

Ethylenediamine: 292.5 g

Ammonium oxalate: 172.9 g

Oxalic acid: 153.4 g

Comparative Example 5

Example 1 was repeated with the exception of using oxalic acid. Oxalic acid was the sole anion source (i.e., mole fraction of 1). 1500 g of the silver solution was prepared using the following components, with the target Ag content of 30% in solution:

Silver oxide: 490.0 g

Water: 416.0 g

Ethylenediamine: 333.0 g

Oxalic acid: 261.0 g

The catalyst composition and testing results are summarized in Table 1 below:

TABLE 1

Catalyst composition and performance

| | | Example: | | | | |
|---|---|---|---|---|---|---|
| | | 1 | 2 | 3 | 4 | 5, comparative |
| Catalyst composition, mole fraction of anion in solution | Oxalic acid | 0 | 0 | 0.8 | 0.5 | 1 |
| | Ammonium oxalate | 1 | 0 | 0 | 0.5 | 0 |
| | Ammonium bicarbonate | 0 | 1 | 0.1 | 0 | 0 |
| | Ammonium formate | 0 | 0 | 0.1 | 0 | 0 |
| Ag (%) on catalyst | | 18.90 | 18.97 | 19.50 | 19.16 | 16.59 |
| Cs (ppm) | | 660 | 671 | 653 | 636 | 663 |
| Re (ppm) | | 297 | 281 | 279 | 290 | 292 |
| Peak selectivity (%) | | 90.5 | 90.0 | 89.5 | 90.6 | 90.4 |
| Temperature at peak selectivity (° C.) | | 252 | 262 | 255 | 254 | 259 |

Silver Impregnating Solutions Containing One or More Amino Acids as a Silver Concentration Enhancer In the following examples, oxalic acid has been replaced, in whole or in part, with the amino acid glycine. It has herein been found that the use of an amino acid increases silver solubility in impregnation solutions, even in the absence of oxalic acid. Silver solubility can also be improved by mixing the amino acid with oxalic acid at different mole fractions. In particular, silver solubility in ethylenediamine can be increased from 31% to, for example, 36% by completely or partially replacing oxalic acid with glycine. Application of the high concentration solutions on a support can increase the silver loading on the catalyst carrier by, for example, 10%-20% in a single impregnation in comparison to an impregnation solution containing oxalic acid and no amino acid.

Example 6

500 g of silver impregnation solution was prepared using the following components with a target Ag content of 35% in solution. Glycine was the sole anion source.
Silver oxide: 187.97 g
Water: 92.74 g
Ethylenediamine: 97.50 g
Glycine: 121.79 g
Solution Preparation Water was gradually mixed with ethylenediamine in a container placed in an ice bath to control the solution temperature to between 20 and 30° C. with vigorous agitation. Glycine was subsequently added to the solution while the temperature was maintained at 20 to 30° C. After the glycine was completely dissolved, silver oxide was added to the solution at a temperature between 20 to 30° C. Once all of the silver oxide was added, the solution was agitated for another 30-40 minutes to ensure proper mixing. The solution was filtered by use of a vacuum pump to provide a silver stock solution for use in catalyst preparation. The Ag content in the filtered solution was found to be 34.62%.
Catalyst Preparation
a. Promoter Addition:

The formulation for the high selectivity catalysts was optimized with the addition of Cs and Re promoters. Promoters were mixed with the stock silver solution prior to impregnation.
b. Catalyst Impregnation:

A 120 g sample of carrier was placed in a pressure vessel and then exposed to vacuum until the pressure was reduced to below 10 mm Hg. Then 360 g of the adjusted silver/promoters solution was introduced to the flask while it was still under vacuum, and the pressure of the vessel was allowed to rise to atmospheric pressure. The impregnated carrier was then separated from the solution before proceeding to the calcination process.
c. Catalyst Calcination.

Calcination was conducted by heating the impregnated carrier up to the decomposition temperature of silver salts to induce deposition of elemental silver. This was achieved via heating in a furnace having several heating zones in a controlled atmosphere. The catalyst was loaded on a moving belt that entered the furnace at ambient temperature. The temperature was gradually increased as the loaded carrier passed from one zone to the next. The temperature was increased, up to 400° C., as the loaded carrier passed through four heating zones. After the heating zones, the belt passed through a cooling zone that gradually cooled the catalyst to a temperature lower than 100° C. The atmosphere of the furnace was controlled by the use of nitrogen flow in the different heating zones. The final analytical result indicated that the catalyst contained about 18.50% Ag.

Example 7

Example 6 was repeated with the exception of using glycine and oxalic acid as the anion contributors. The mole ratio of glycine to oxalic acid was 1:2.

500 g of the silver solution was prepared using the following components, with a target Ag content of 34% in solution. Oxalic acid was added prior to the addition of glycine and after EDA and water mixing. The Ag content in the filtered solution was 33.78%. The Ag loading in the catalyst was 17.75%.
Silver oxide: 182.60 g
Water: 119.55 g
Ethylenediamine: 94.72 g
Oxalic acid: 79.47
Glycine: 23.66 g Comparative Example 8

Example 6 was repeated with the exception of using oxalic acid. 100 g of the silver solution was prepared using the following components, with a target Ag content of 30% in solution. Oxalic acid was the sole anion source. The Ag content in the filtered solution was 30.20%, and the Ag loading in the catalyst was 16.5%.
Silver oxide: 32.67 g
Water: 27.73 g Ethylenediamine: 22.20 g
Oxalic acid: 17.40 g While there have been shown and described what are presently believed to be the preferred embodiments of the present disclosure, those skilled in the art will realize that other and further embodiments can be made without departing from the spirit and scope of the present disclosure, and this disclosure includes all such modifications that are within the intended scope of the claims set forth herein.

What is claimed is:

1. A silver impregnation solution comprising:
   (i) silver ions,
   (ii) a silver concentration enhancer selected from at least one ammonium salt having an anionic component that is thermally decomposable, or at least one amino acid, or a combination thereof;
   (iii) at least one organic amine; and
   (iv) water;
   wherein said components (i)-(iii) are dissolved in said impregnation solution; and said impregnation solution contains silver in a concentration of at least 33 wt % and up to 40 wt %.

2. The silver impregnation solution of claim 1, further comprising oxalic acid.

3. The silver impregnation solution of claim 1, wherein oxalic acid is excluded.

4. The silver impregnation solution of claim 1, wherein said silver concentration enhancer is at least one ammonium salt having an anionic component that is thermally decomposable.

5. The silver impregnation solution of claim 4, wherein said ammonium salt possesses a carbon-containing anion.

6. The silver impregnation solution of claim 4, wherein said ammonium salt is selected from ammonium carboxylates, ammonium carbonate, ammonium bicarbonate, ammonium nitrate, ammonium phosphate, diammonium hydrogen phosphate, and ammonium dihydrogen phosphate.

7. The silver impregnation solution of claim 4, wherein said ammonium salt comprises at least one ammonium carboxylate.

8. The silver impregnation solution of claim 7, wherein said ammonium carboxylate is selected from ammonium formate, ammonium acetate, ammonium propionate, ammonium butyrate, ammonium valerate, ammonium oxalate, ammonium hydrogen oxalate, ammonium malonate, ammonium hydrogen malonate, ammonium succinate, ammonium hydrogen succinate, ammonium maleate, ammonium hydrogen maleate, ammonium fumarate, ammonium hydrogen fumarate, ammonium malate, ammonium hydrogen malate, ammonium citrate, ammonium tartrate, ammonium lactate, ammonium aspartate, and ammonium glutamate.

9. The silver impregnation solution of claim 1, wherein said silver concentration enhancer is at least one amino acid.

10. The silver impregnation solution of claim 9, wherein said at least one amino acid is selected from glycine, alanine, and valine.

11. The silver impregnation solution of claim 1, wherein said organic amine is selected from alkylamines, alkylenediamines, and alkanolamines.

12. The silver impregnation solution of claim 1, wherein said organic amine comprises an alkylenediamine.

13. The silver impregnation solution of claim 12, wherein said alkylenediamine comprises ethylenediamine.

14. The silver impregnation solution of claim 1, wherein said silver impregnation solution contains silver in a concentration of at least 34 wt % and up to 40 wt %.

15. The silver impregnation solution of claim 1, wherein said silver impregnation solution contains silver in a concentration of at least 35 wt % and up to 40 wt %.

16. The silver impregnation solution of claim 1, further comprising a promoting species selected from alkali, alkaline earth, and transition metals.

17. A method for producing a catalyst effective in the oxidative conversion of ethylene to ethylene oxide, the method comprising subjecting a refractory carrier impregnated with a liquid silver-containing solution to a calcination process, wherein said liquid silver-containing solution comprises:
   (i) silver ions,
   (ii) a silver concentration enhancer selected from at least one ammonium salt having an anionic component that is thermally decomposable, or at least one amino acid, or a combination thereof;
   (iii) at least one organic amine; and
   (iv) water;
   wherein said components (i)-(iii) are dissolved in said liquid silver-containing solution, and said impregnation solution contains silver in a concentration of at least 33 wt % and up to 40 wt %.

18. The method of claim 17, wherein the refractory carrier is comprised of an alumina.

19. The method of claim 17, wherein said liquid silver-containing solution further comprises oxalic acid.

20. The method of claim 17, wherein said liquid silver-containing solution excludes oxalic acid.

21. The method of claim 17, wherein said silver concentration enhancer is at least one ammonium salt having an anionic component that is thermally decomposable.

22. The method of claim 21, wherein said ammonium salt possesses a carbon-containing anion.

23. The method of claim 21, wherein said ammonium salt is selected from ammonium carboxylates, ammonium carbonate, ammonium bicarbonate, ammonium nitrate, ammonium phosphate, diammonium hydrogen phosphate, and ammonium dihydrogen phosphate.

24. The method of claim 21, wherein said ammonium salt comprises at least one ammonium carboxylate.

25. The method of claim 24, wherein said ammonium carboxylate is selected from ammonium formate, ammonium acetate, ammonium propionate, ammonium butyrate, ammonium valerate, ammonium oxalate, ammonium hydrogen oxalate, ammonium malonate, ammonium hydrogen malonate, ammonium succinate, ammonium hydrogen succinate, ammonium maleate, ammonium hydrogen maleate, ammonium fumarate, ammonium hydrogen fumarate, ammonium malate, ammonium hydrogen malate, ammonium citrate, ammonium tartrate, ammonium lactate, ammonium aspartate, and ammonium glutamate.

26. The method of claim 17, wherein said silver concentration enhancer is at least one amino acid.

27. The method of claim 26, wherein said at least one amino acid is selected from glycine, alanine, and valine.

28. The method of claim 17, wherein said organic amine is selected from alkylamines, alkylenediamines, and alkanolamines.

29. The method of claim 17, wherein said organic amine comprises an alkylenediamine.

30. The method of claim 29, wherein said alkylenediamine comprises ethylenediamine.

31. The method of claim 17, wherein said liquid silver-containing solution contains silver in a concentration of at least 34 wt % and up to 40 wt %.

32. The method of claim 17, wherein said liquid silver-containing solution contains silver in a concentration of at least 35 wt % and up to 40 wt %.

33. The method of claim 17, wherein said liquid silver-containing solution further comprises a promoting species selected from alkali, alkaline earth, and transition metals.

34. A silver impregnation solution comprising:
(i) silver ions;
(ii) a silver concentration enhancer comprising at least one amino acid;
(iii) at least one organic amine; and
(iv) water; wherein said components (i)-(iii) are dissolved in said impregnation solution; and said impregnation solution contains silver in a concentration of at least 33 wt % and up to 40 wt %.

35. The silver impregnation solution of claim 34, where said at least one amino acid is selected from glycine, alanine and valine.

\* \* \* \* \*